Figure 1:
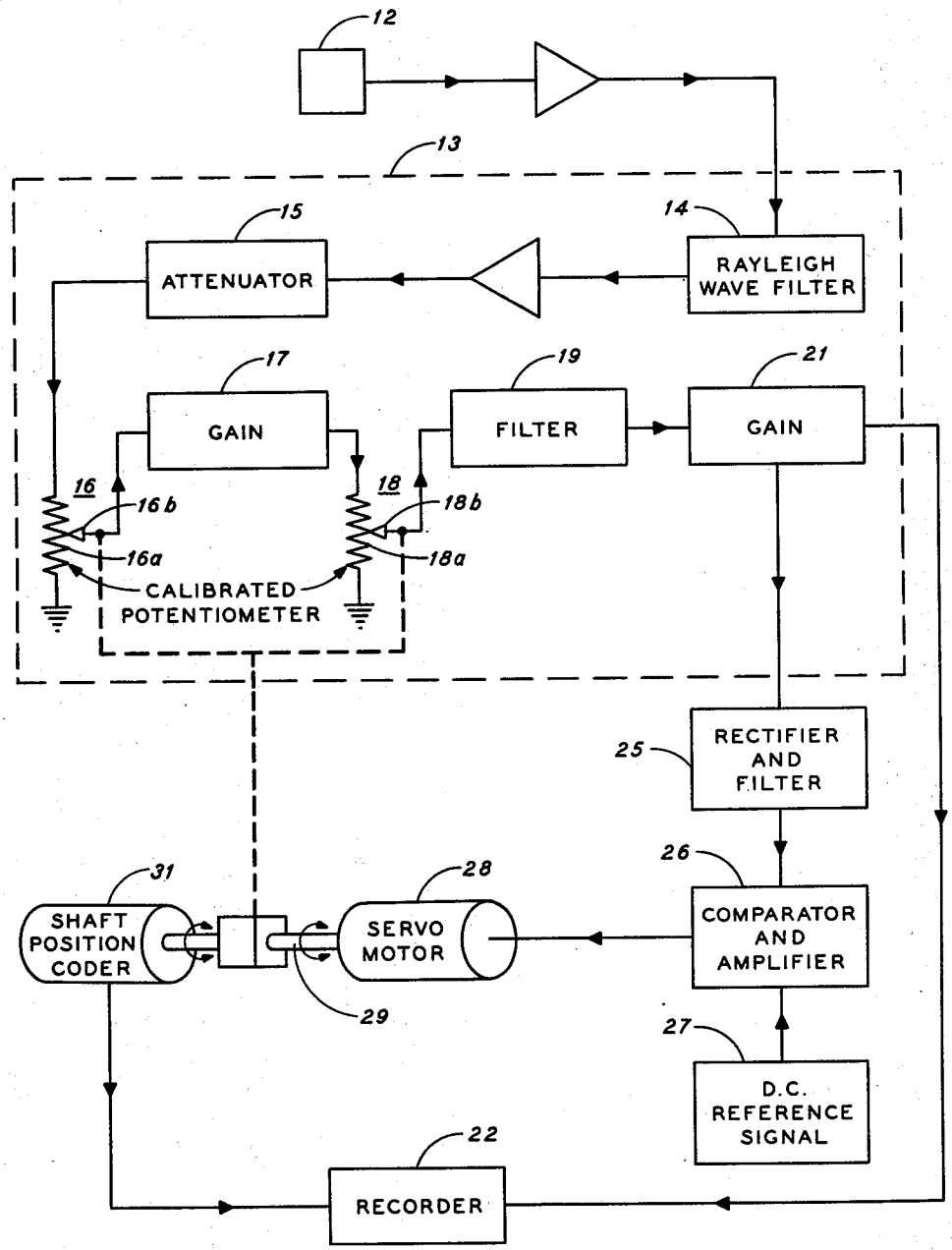

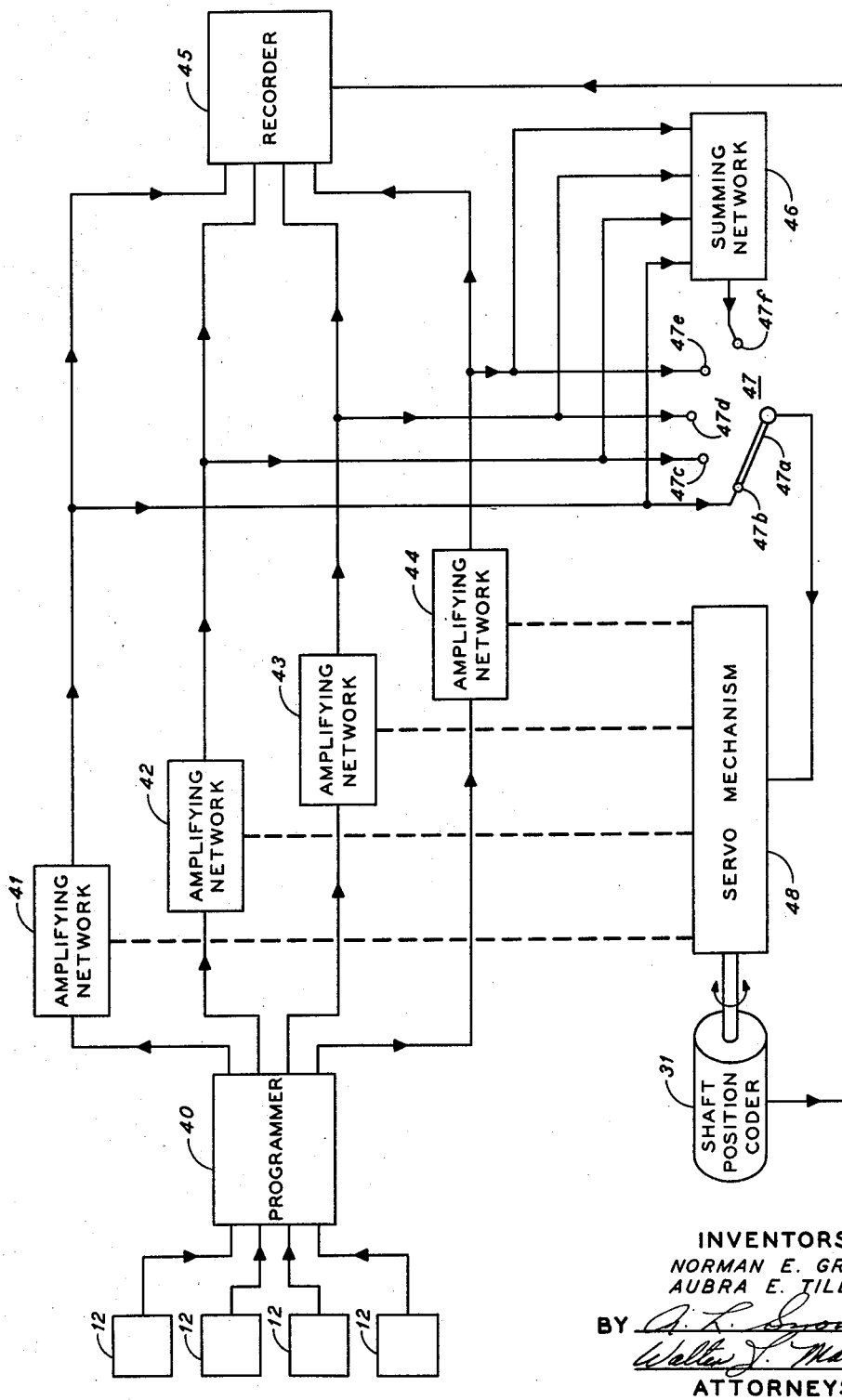

United States Patent Office 2,934,741
Patented Apr. 26, 1960

2,934,741

CALIBRATED AUTOMATIC GAIN CONTROL FOR SEISMIC AMPLIFIERS

Norman E. Gray, Anaheim, and Aubra E. Tilley, Fullerton, Calif., assignors to California Research Corporation, San Francisco, Calif., a corporation of Delaware Application January 16, 1956, Serial No. 559,286

3 Claims. (Cl. 340—15)

This invention relates in general to seismic prospecting and relates more specifically to the control of the amplifying networks used in recording seismic detector signals.

In the art of seismic prospecting, the mechanical energy of seismic waves artificially generated in the earth is translated into electrical impulses by means of a plurality of seismic wave detectors, and these impulses are amplified and recorded in some manner for analysis. Since the magnitude of the impulses generated by the detectors varies over a substantial range during the period in which the seismic waves are detectable, some type of control of the gain with which the impulses are amplified is required to obtain amplified impulses having maximum limits lying within the limits of the amplifying means and of the recording means, and having minimum limits which will produce a legible record. A number of methods have been proposed for effecting such control, such as a preset gain control in which the gain of the amplifying network is increased as a predetermined function of time, the particular funtion being selected on the basis of a prior knowledge of the prospected area. In another method of automatic gain control, a closed loop network is utilized in which a measure of the amplifier network output signal is fed back as a gain control signal to maintain the amplitude of the amplifier output signal within predetermined limits. Such gain control necessarily distorts the amplitudes of the seismic detector signals to maintain them within the desired amplitude limits, so that it is difficult to determine the absolute amplitude of the signals.

There is an increasing demand in seismic prospecting for some method of obtaining an accurate indication of the amplitude of the seismic detector signals, either as a measure of the absolute amplitude of individual signals or an absolute measurement of the amplitude ratios of different signals. Heretofore several methods have been proposed for obtaining such indications. In one of these, a programmed or preset gain control amplifier, such as described above, is utilized to control the amplifier during recording of the signals and then, by correlating the recorded signal amplitude with the programmed gain, some indication may be obtained of the seismic detector signal amplitude. However, this method has the disadvantage that the operator of the equipment is forced to estimate in advance the programming function for the gain control, and variations in shooting conditions and ground attenuation of the seismic energy adversely affect the accuracy of the programming function.

In another method of obtaining an indication of signal energy level, the seismic detector signal is passed through a network which produces a signal whose amplitude is logarithmically related to the absolute amplitude of the detector signal itself. This logarithmic signal is then recorded simultaneously with the amplified detector signals for correlation therewith. However, this method has the disadvantage that, owing to the characteristics of the elements necessarily used in the logarithmic network, the accuracy thereof is extremely poor, with the result that the logarithmic signal is primarily useful only as an indication of the relative signal energy levels throughout the seismic disturbance.

Broadly the present invention contemplates methods and apparatus for controlling the gain of a seismic amplifying network in which the seismic detector signal is variably attenuated in response to the amplitude of the amplifier output signal and a continuous indication is provided of the degree of attenuation of the seismic detector signal. More particularly, the present invention contemplates the use of one or more highly accurate calibrated attenuation networks or devices through which the seismic detector signal passes, and in which the seismic detector signal is variably attenuated. The attenuation in the attenuation networks is controlled as a function of the amplitude of the output signal of the amplifying network and a continuous indication is provided of the degree of attenuation undergone by the detector signal. This indication of attenuation is preferably recorded in conjunction with the seismic detector signals themselves so that the absolute amplitude of the seismic detector signal may be determined by correlating the amplitude of the recorded seismic detector signal with the signal which indicates the degree of attenuation of the signal.

In one form of the present invention, the variable attenuation network comprises an accurately calibrated potentiometer across which is impressed the seismic detector signal. The adjustable tap of the potentiometer, whose position on the potentiometer determines the attenuation of the signal therein, is driven by a servomechanism. The servomechanism in turn is controlled in response to the amplitude of the output signal of the amplifying network. In a preferred form of the invention, a measure of an amplifier network output signal is compared with a reference signal and the difference therebetween is supplied to the servo motor which positions the adjustable tap of the potentiometer in a manner which tends to reduce the difference between the two compared quantities. The servomechanism also includes a device for providing an indication of the degree of attenuation of the seismic detector signal in the variable attenuation network. Such a device may be of any suitable type which provides an indication of the rotative position of the shaft which drives the potentiometer tap or brush. Since the potentiometers are accurate precision devices, the measure of their brush position is an accurate indication of the degree of attenuation.

The present invention may also be utilized in connection with a plurality of separate seismic channels, such as usually encountered in seismic prospecting. For example, one master servomechanism may be provided to control the respective potentiometers of a plurality of parallel seismic amplifying networks. In such instances one of the plurality of amplifying networks may be selected as the master amplifier and a measure of its output signal is utilized to control the servomechanism for controlling the gains of all of the amplifying networks. Alternatively, the different amplifier outputs may be summed to provide a composite signal for controlling the servomechanism in response to the sum of the different signals. In an additional refinement of the present invention a programming device may be provided between the seismic detectors and the inputs to the amplifying networks. This programming device generates a calibrated steady-state sine wave signal which is supplied through all amplifying channels prior to the time break to provide on the recording device a measure of the relative sensitivities of the different channels.

Objects and advantages of the present invention will be further apparent from the following description when read in connection with the accompanying drawing, in which:

Fig. 1 diagrammatically and schematically illustrates one embodiment of the present invention utilized in providing calibrated automatic gain control for a single seismic channel; and Fig. 2 diagrammatically and schematically illustrates an alternate embodiment of the present invention for providing a calibrated automatic gain control for a plurality of seismic channels utilizing one master calibrated gain control network.

Referring to Fig. 1 by character of reference, numeral 12 designates a seismic detector for converting motion of the earth's surface in response to a seismic disturbance into an electrical signal varying in sympathy with such movement. The output signal from seismic detector 12 is supplied to an amplifying network or channel which comprises the elements shown within the dotted enclosure 13. The first element in the amplifying network may comprise a filter 14 for removing the Raleigh wave and ground roll components from the seismic detector signal. The output from filter 14 is supplied to an adjustable attenuation network 15, which provides manual adjustment of the seismic detector amplitude level for a purpose which will be more fully described hereinbelow.

The output from attenuator 15 is impressed across the resistive element 16a of a calibrated potentiometer 16 which comprises a variable attenuation network. Calibrated potentiometer 16 also includes an adjustable tap or brush 16b, which is movable over resistor 16a to vary the voltage between tap 16b and ground. Tap 16b is electrically connected to an amplifier 17 of preferably fixed gain, which increases the amplitude of the signal passing therethrough. The output from amplifier 17 is impressed across a second calibrated potentiometer 18 having an adjustable tap 18b. Adjustable tap 18b is electrically connected to the input of a filter network 19 which provides additional filtering of the seismic detector signal. In the embodiment illustrated in Fig. 1, two calibrated potentiometers are provided in order to produce the required degree of attenuation of the seismic signal. However, it will be understood that one such potentiometer could be utilized if it provides the required degree of attenuation.

The output from filter 19 is supplied to a second amplifier 21 having a preferably fixed gain. One output from amplifier 21 is supplied to a recording device 22 for providing an indication of the amplitude of the seismic detector signal. Another output from amplifier 21 is supplied through a rectifier and filter network 25 to a comparator and amplifier network 26 in which the detected seismic signal is compared in amplitude with a D.C. reference from the reference signal generator 27. The difference between the compared quantities is supplied as a control signal to a servo motor 28 which rotates in a direction and with a velocity determined by the polarity and magnitude, respectively, of the difference signal from network 26. Servo motor 28 drives a shaft 29 which is mechanically connected, as shown by the dotted lines, to adjustable taps 16b and 18b of calibrated potentiometers 16 and 18. Shaft 29 also drives a suitable device for providing an indication of the position of taps 16b and 18b. Such a device may be a shaft position coder device 31 which is mechanically connected to shaft 29 and which supplies an output signal to recorder 22 indicating the rotative position of shaft 29 and taps 16b and 18b.

The seismic detector signal generated by detector 12 is supplied to the input of amplifying network 13, and assuming representative or median positions of taps 16b and 18b of potentiometers 16 and 18 respectively, the operation of the embodiment illustrated in Fig. 1 is as follows: A measure of the amplitude of the output signal of amplifier network 13 is supplied from amplifier 21 through network 25 to one input of comparator and amplifier network 26. This signal is compared in network 26 with the reference signal from network 27. The magnitude of the signal from reference network 27 is a measure of the desired amplitude of the output signal of amplifier network 13, and the difference between this reference signal and the signal from amplifier 21 is a measure of the difference between the actual amplitude of the amplifier network output and the desired amplitude.

This differences signal is supplied from network 26 to servo motor 28, which rotates with a velocity and in a direction determined by the polarity and magnitude of this difference signal. Rotation of servo motor 28 and shaft 29 drives potentiometer taps 16b and 18b to vary the proportions of the total voltages across resistors 16a and 18a which are supplied to amplifiers 17 and 21. Assuming that the output from amplifier network 13 has a magnitude greater than the desired magnitude, servo motor 28 drives taps 16b and 18b in a direction to reduce the proportions of the voltages across resistors 16a and 18a which are passed on through the amplifying network.

Rotation of servo motor 28 and shaft 29 also drives position coder 31, which produces an indication of the rotative position of the servo motor 28 and shaft 29. This indicating signal, which is also a measure of the position of taps 16b and 18b on potentiometers 16 and 18 respectively, is supplied to recorder 22, where it is recorded simultaneously with the amplified seismic detector signal. Thus, a measure is provided on recorder 22 of the degree of attentuation undergone by the seismic detector signal in potentiometers 16 and 18 respectively, and an indication may be obtained of the instantaneous absolute amplitude of the detector signal itself.

The relationship between the magnitude of the seismic wave received by the seismic detector and the seismic detector signal recorded on recorder 22 is a function of the overall gain of amplifier network 13, and the sensitivity of the galvanometer or other recording element in recorder 22. Thus from a knowledge of the sensitivity of the recording element in recorder 22 and the knowledge of the instantaneous attention introduced by potentiometers 16 and 18, an accurate measure may be obtained of the absolute amplitude of the seismic detector signal generated by detector 12 at any instant during the seismic disturbance.

The embodiment illustrated in Fig. 1 may be utilized in connection with calibrated gain control for a single seismic channel. In practice, however, a plurality of channels are normally provided for each seismic disturbance, and it is desirable that the gain in each of such channels be calibrated so that an indication may be obtained of the absolute value of the ratios of the amplitudes of different signals in the same disturbance. This could be accomplished by providing a separate calibrated gain control for each channel, although the equipment required for this would be rather bulky for field use. The embodiment illustrated in Fig. 2 utilizes one master calibrated gain control to control a plurality of seismic channels. In Fig. 2, reference character 12 designates each of a plurality of seismic wave detectors representing a plurality of seismic channels. In Fig. 2, four such channels have been illustrated, although it will be understood that the number of such channels may be varied in accordance with field requirements. Seismic wave detectors 12 are connected to a programmer 40. Programmer 40 serves to generate prior to the time break a steady state sine wave signal for each channel which is supplied through the different amplifying channels to the recorder so as to provide an indication on the recorder of the relative sensitivities of the different amplifying channels and their corresponding galvanometers. After the time break, programmer 40 supplies the output from each of seismic wave detectors 12 to an associated amplifying network designated by reference characters 41, 42, 43, and 44, it being understood that these networks are substantially identical to amplifying network 13 of Fig. 1.

The outputs from amplifying networks 41, 42, 43, and 44 are supplied in parallel to a recorder 45 and to a summing and selecting network. A summing network 46 receives a measure of the output signal of each of the amplifying networks 41, 42, 43, and 44, and produces an output signal proportional to the sum of these signals. A selector switch 47 is provided for selecting the controlling input to the servomechanism. Switch 47 is provided with a contact arm 47a and contacts 47b, 47c, 47d, 47e, and 47f which are selectively engageable with arm 47a. Contact 47b is connected to amplifying network 41, contact 47c is connected to amplifying network 42, contact 47d is connected to amplifying network 43, contact 47e is connected to amplifying network 44, and contact 47f is connected to the output of summing network 46. Contact arm 47a is connected to the input of a suitable servomechanism 48.

Servomechanism 48 is identical in operation to the mechanism described in connection with Fig. 1 and may comprise elements 25, 26, 27, and 28 of Fig. 1. The measure of the output of the selected amplifier network is compared in servomechanism 48 with a reference quantity and the difference between the compared quantities is utilized to provide a mechanical output to control the attenuation of the signals passing through amplifier networks 41, 42, 43, and 44. This mechanical connection, indicated by the dotted lines from servomechanism 48 to the different amplifying networks, preferably drives the adjustable taps on calibrated potentiometers similar to potentiometers 16 and 18 of Fig. 1. Servomechanism 48 also drives a shaft coding device 31 which is connected to recorder 45 for providing thereon an indication of the rotative position of the servomechanism and hence an indication of the degree of attentuation of the seismic signals through the different amplifying networks.

In operation, selector switch 47 is adjusted to provide the desired input to servomechanism 48. This input may be any of the output signals of networks 41, 42, 43, or 44, or the summed output of these amplifying networks from summing network 46. Prior to the time break, programmer device 40 provides a calibrated steady-state sine wave signal to all of the amplifier networks to provide on recorder 45 an indication of the relative sensitivities of the different channels to facilitate in accurately determining the absolute amplitude levels or absolute amplitude ratios of the different seismic signals. After the time break, the outputs of seismic wave detectors 12 are supplied to amplifying networks 41, 42, 43, and 44. The output signal selected by switch 47 is supplied to servomechanism 48, which operates in a manner similar to that described above in connection with Fig. 1 to adjust the attenuation in amplifying networks 41, 42, 43, and 44 in response to one master control signal.

Although but a few illustrative embodiments of the present invention have been described, it will be apparent to those skilled in the art that various changes and modifications may be made therein without departing from the spirit of the invention or the scope of the appended claims.

We claim:
1. Apparatus for continuously recording seismic data including at least one signal indicative of reflected seismic energy and a second signal indicative of degree of attenuation of said one signal comprising a continuously variable attenuation network including a resistance element, means for impressing a voltage proportional to said reflected seismic energy across said attenuation network, a continuously adjustable tap movable over said resistance element and from which said one signal is derived, a substantially constant reference voltage, a comparator circuit, means for connecting said reference voltage and one signal to said comparator circuit to produce a voltage difference therebetween, a servo-mechanism, means for adjusting said movable tap by said servo-mechanism, means for energizing said servo-mechanism by said difference voltage, means for sensing said adjustment of said movable tap, a recording means, and means for energizing said recording means with said one signal and said sensed adjustment to record said one signal and an indication of the degree of attenuation thereof.

2. Apparatus for continuously recording seismic data consisting of a plurality of signals indicative of reflected seismic energy and a signal indicative of degree of attenuation of said seismic signals comprising a plurality of continuously variable attenuation networks each including a resistance element, means for impressing a voltage proportional to each of said reflected seismic energies across one of said attenuation networks, with each attenuation network having only one voltage impressed thereacross, a continuously adjustable tap movable over said resistive elements and from which each of said plurality of signals is derived, a substantially constant reference voltage, a comparator circuit, means for connecting said reference voltage and at least one of said signals derived from said movable taps to said comparator circuit to produce a voltage of difference therebetween, a servo-mechanism, means for adjusting all of said movable taps by said servo-mechanism, means for energizing said servo-mechanism by said difference voltage, means for sensing said adjustment of said movable taps, a recording means, and means for energizing said recording means, with each of said signals and said sensed adjustment to record each of said signals and an indication of the degree of attenuation thereof.

3. Apparatus for continuously recording seismic data including a plurality of signals indicative of reflected seismic energy and a second signal indicative of degree of attenuation of said signals comprising a plurality of continuously variable attenuation networks each including a resistive element, means for impressing a voltage proportional to each of said reflected seismic energies across one of said attenuation networks, with each attenuation network having only one voltage impressed thereacross, a continuously adjustable tap movable over said resistance elements and from which each of said plurality of signals is derived, a substantially constant reference voltage, a comparator circuit, means connecting said reference voltage and a voltage proportional to the sum of all of said signals to said comparator circuit to produce a voltage of difference therebetween, a servo-mechanism, means for adjusting all of said movable taps by said servo-mechanism, means for energizing said servo-mechanism by said difference voltage, means for sensing said adjustment of said movable taps, a recording means, and means for energizing said recording means with each of said signals and said one sensed adjustment to record each of said signals and an indication of the degree of attenuation thereof.

References Cited in the file of this patent
UNITED STATES PATENTS

| | | |
|---|---|---|
| 2,349,186 | Merten | May 16, 1944 |
| 2,430,983 | Hoover | Nov. 18, 1947 |
| 2,493,534 | Hawkins | Jan. 3, 1950 |
| 2,666,098 | Leonard | Jan. 12, 1954 |
| 2,713,147 | Stripling | July 12, 1955 |